United States Patent [19]

Heaney et al.

[11] 4,064,050
[45] Dec. 20, 1977

[54] FILTER BOTTOM

[75] Inventors: Donald F. Heaney; Delbert L. Boal, both of Pittsburgh, Pa.

[73] Assignee: Dravo Corporation, Pittsburgh, Pa.

[21] Appl. No.: 662,131

[22] Filed: Feb. 27, 1976

[51] Int. Cl.[2] .............................................. B01D 23/18
[52] U.S. Cl. ................................................... 210/293
[58] Field of Search ................ 210/291, 293, 477, 292

[56] References Cited

U.S. PATENT DOCUMENTS

| 1,687,782 | 10/1928 | Norton | 210/293 |
| 3,468,422 | 9/1969 | Camp | 210/293 X |

FOREIGN PATENT DOCUMENTS

| 1,007,754 | 5/1952 | France | 210/293 |
| 696,980 | 10/1940 | Germany | 210/292 |
| 833,628 | 7/1949 | Germany | 210/292 |
| 4,141 of | 1906 | United Kingdom | 210/293 |

*Primary Examiner*—William A. Cuchlinski, Jr.

*Attorney, Agent, or Firm*—Parmelee, Miller, Welsh & Kratz

[57] ABSTRACT

A nozzleless, strainerless filter bottom includes a first set of blocks laid end-to-end in spaced parallel rows to define elongated channels. Transverse grooves in the lower surface of the first set of blocks provide communication between adjacent channels. A second set of blocks laid end-to-end in spaced rows which are parallel to and overlap the rows of first blocks form covers for the longitudinal channels. Transverse slots in the lower surface of the second set of blocks form with the upper surface of the first set of blocks passages through which filtrate and backwash fluid may pass without clogging. A pair of laterally spaced longitudinal flanges depending from the lower surface of the second set of blocks extend into the lower elongated channels and bear against the adjacent sides of the first set of blocks to prevent lateral displacement of both sets of blocks. Longitudinal ribs extending upwardly from the upper surface of the first set of blocks give added strength thereto and prevent clogging of the passages with filter media.

6 Claims, 3 Drawing Figures

FILTER BOTTOM

BACKGROUND OF THE INVENTION

1. Field of the Invention

This invention relates to bottoms for filter beds and more particularly to bottoms for filters in which a backwash fluid is periodically introduced from beneath the filter bed.

2. Prior Art

It is common practice to periodically backwash a filter bed by introducing a fluid in the form of a gas, a liquid or a combination of the two through the bottom of the filter. It is known to introduce the backwash fluid through nozzles served by pipes laid in channels in the filter bottom. It is also known to provide a false bottom of porous material or with strainers therein through which the backwash fluid may be introduced into the filter bed. A common problem with these prior art constructions is that the nozzles, porous material or strainers can become clogged over a period of time with material which cannot be removed by the backwashing. This condition necessitates that the filter be torn down for cleaning or replacement of the clogged parts.

U.S. Pat. No. 2,710,692 suggests that backwash gas emitted from apertures in pipes laid below the filter bed be collected in inverted channels laid transverse to and above the pipes. The gas is said to disperse along the channel members and escape uniformly through slots in the lower portion of the channels. The gas then percolates upward and passes through longitudinal spaces between elongated members forming a false bottom which supports the filter media.

In another type of filter bottom, a number of concrete blocks, called M blocks because of the cross section of a channel extending lengthwise through the blocks, are placed end-to-end in parallel rows on the floor of the filter bed with the open side facing downward to provide an array of parallel, elongated chambers below a false bottom. Backwash gas introduced into selected chambers by pipes laid therein percolates upward and is diverted laterally by the M-shaped roof of the chamber to bores in the side walls of the blocks. Projections on the sides of the blocks maintain spacing between adjacent rows of blocks such that the backwash gas may escape from the side bores. Transverse openings at the bottom of the side walls of each block interconnect the parallel, elongated chambers. This arrangement provides a strong floor for the filter media which does not easily clog, however, the M blocks are expensive and difficult to fabricate.

SUMMARY OF THE INVENTION

According to the invention, a filter bed comprises a first set of elongated elements laid parallel to each other at spaced intervals to define elongated channels therebetween. A second set of spaced apart longitudinal elements laid in parallel, overlapping relation to the first longitudinal elements form a roof for the lower elongated channels. The second longitudinal elements are provided with generally transverse slots in the lower surface thereof which together with the upper surface of the adjacent first longitudinal elements define passages which provide communication between the longitudinal channels and the space above the blocks.

Preferably, the second longitudinal elements are provided with laterally spaced projections depending from the lower surface thereof which extend into the lower longitudinal channels and bear against the side walls of the adjacent first longitudinal elements to prevent lateral displacement of the first and second longitudinal elements. These projections may be in the form of longitudinal flanges interrupted by the transverse slots in the lower surface of the second longitudinal elements. Preferably, the slots in the lower surface of the second longitudinal elements become shallower from the lateral faces of the longitudinal elements inward toward the longitudinal center thereof. In addition, the first longitudinal elements may be provided with transverse channels in the form of grooves in the lower surfaces thereof which provide communication between adjacent lower elongated channels. Upwardly projecting longitudinal ribs may be provided on the upper surface of the first longitudinal members between the second longitudinal members. These ribs strengthen the first longitudinal members and when disposed adjacent the second longitudinal members help to prevent filter media from clogging said passages.

In the preferred embodiment of the invention, the first and second longitudinal members comprise a plurality of blocks laid end-to-end.

DESCRIPTION OF THE PREFERRED EMBODIMENT

Figure 1:
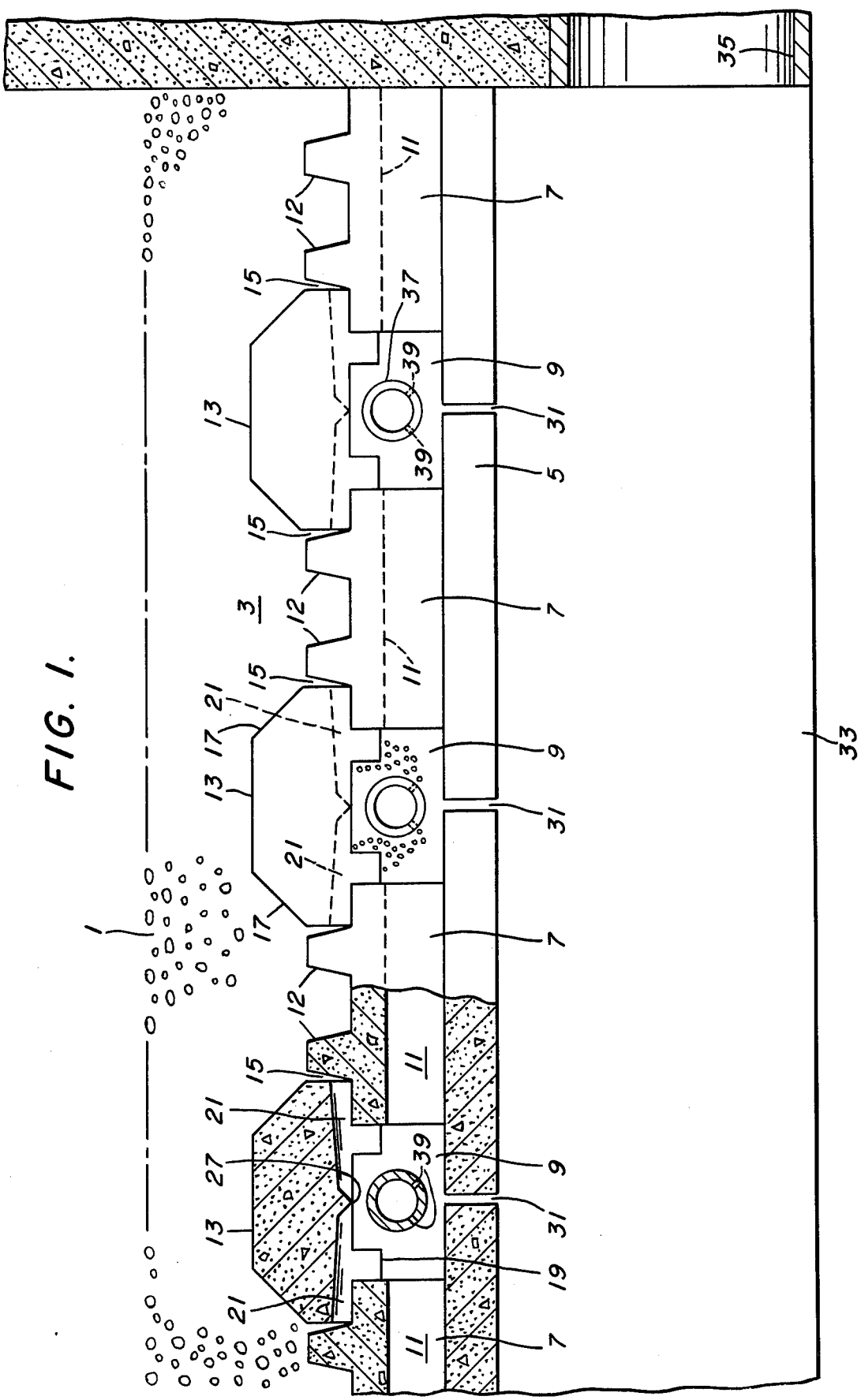
FIG. 1 is a vertical section through a portion of a filter bed having a bottom constructed in accordance with the teachings of the invention.
Figure 2:
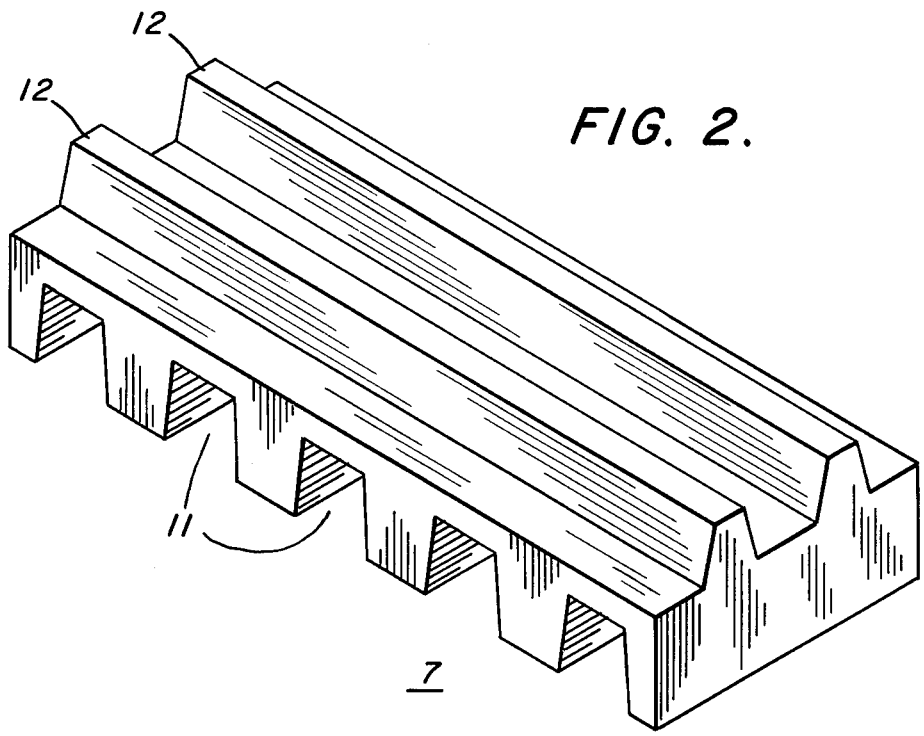
FIG. 2 is a perspective view of one element of a filter bottom made in accordance with the invention.

As illustrated in FIG. 1, the filter media 1 in the lower portion of a filter bed, typically gravel, rests on a false bottom 3 which in turn is supported by a floor 5. The falso bottom 3 comprises a first set of longitudinal elements in the form of blocks 7 laid end-to-end in spaced parallel rows on the floor 5 to define lower elongated channels 9 therebetween. As best seen in FIG. 2, these lower blocks 7, which are cast from concrete or other suitable material, are roughly rectangular in form with a number of transverse channels or grooves 11 of trapezoidal cross section extending across the bottom thereof. The grooves 11 permit free communication between the longitudinal channels 9. The lower blocks 7 are provided with two (as shown) or more longitudinal ribs 12 on the top thereof for added strength and for other purposes discussed below.

Figure 3:
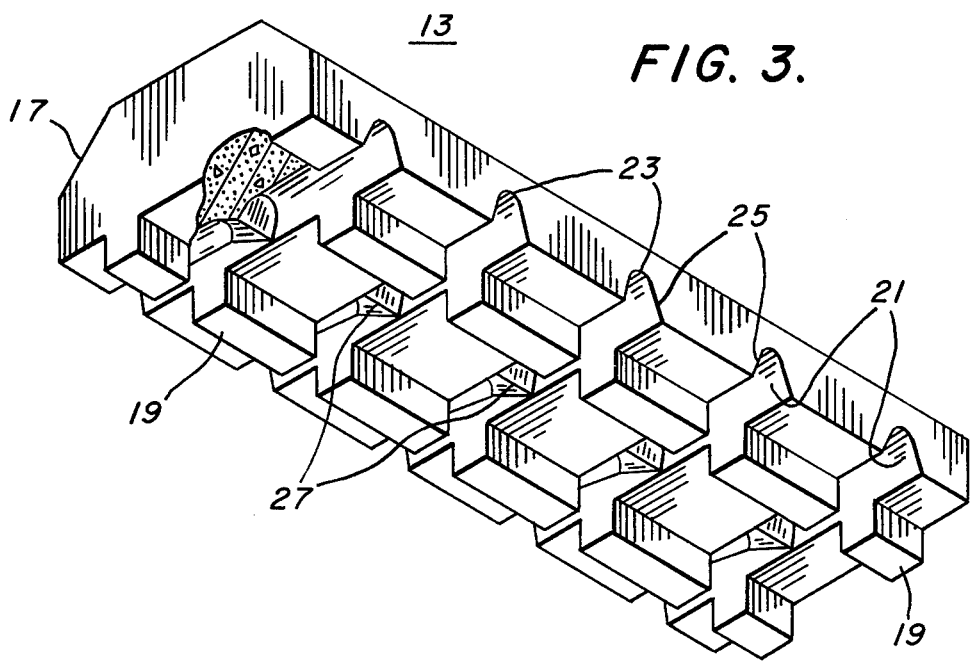
FIG. 3 is a perspective view of the underside of a second element of a filter bottom made in accordance with the invention.

A second set of longitudinal elements in the form of blocks 13 are laid end-to-end in parallel rows which overlap adjacent rows of lower blocks 7 to form a roof for each of the elongated channels 9. As best seen in FIG. 3, which is a perspective view of the underside, each upper block 13 is roughly rectangular in form with the upper longitudinal edges 17 beveled and with a pair of laterally spaced projections in the form of longitudinal flanges 19 depending from the lower surface. These flanges 19 extend into the longitudinal channels 9 and bear against the sides of adjacent lower blocks 7 to lock both sets of blocks in place.

The upper blocks 13 are also provided with a number of transverse slots 21 extending across the bottom surface thereof and through the longitudinal flanges 19. As shown, the slots have rounded roofs 23 with slightly diverging side walls 25 (typically 5 degrees). The roofs 23 of the slots 21 angle downward slightly for an extended length and then sharply toward the longitudinal center 27 of the lower surface of the upper blocks such that the slots become shallower from the lateral faces inward toward the longitudinal center of the blocks. The slots 21 together with the upper surface of the adjacent lower blocks form passages which provide communication between the longitudinal channels 9 and the space above the blocks. The longitudinal ribs 12 provided on the upper surface of each of the lower blocks 7 have upwardly converging side walls which together with the side walls of the upper blocks 13 form elongated slots 15 which protect against clogging of these passages with filter media. Furthermore, the ribs 12 in addition to or in lieu of the flanges 19 can be used to prevent the blocks from sliding out of place laterally.

The floor 5 of the filter bed is provided with slots 31 which provide communication between the lower elongated channels 9 and a transverse trough 33 located below the floor. During filtration, the filtrate passes down through the filter media 1 into the upper elongated channels 15, through the passages formed by the slots 21 and the upper surface of the lower blocks 7 into the lower elongated channels 9 from which it drains down through the passages 31 into the trough 33 and is withdrawn through pipe 35. Periodically, the filter is backwashed by compressed air, which is distributed through the lower elongated channels 9 by pipes 37. The gas is evenly discharged into the lower elongated channels 9 by apertures 39 distributed along the pipes 37. The gas then percolates upward and is diverted by the upward slanting roofs of the slots 21 to the upper elongated channels 15 from which it percolates upward through the filter media to cleanse the filter in a well known manner.

Following gas scouring of the filter, rinse water is pumped into the trough 33 through the pipe 35, passes up through the passages 31 into the lower elongated channels 9 where it is evenly distributed under the filter bed, continues upward through the slots 21 and upper elongated channels 15, and then passes upward through the filter material to carry the remaining foreign material to the surface where it is removed in a conventional manner.

Our construction provides a filter bottom with nonclogging, even flow across the entire bed. It also provides a filter bottom which can be manufactured from nonporous materials and which accommodates a nozzleless, strainerless gas and water backwash. The nonclogging construction combined with the even distribution of both the backwash gas and rinse water permits more rapid and thorough cleaning of the filter using less backwash water than conventional constructions. These advantages are achieved with a filter bottom which is easier and less expensive to fabricate, install and maintain.

We claim:
1. A filter bottom comprising:
 a first set of longitudinal elements laid parallel to each other at spaced intervals to define elongated channels therebetween; and
 a second set of spaced longitudinal elements laid in parallel overlapping relation to the first longitudinal elements forming a roof for the elongated channels, said second longitudinal elements being provided with generally transverse slots in the lower surface thereof which together with the upper surface of the adjacent first longitudinal elements define passages which provide communication between the longitudinal channels and the space above the longitudinal elements, said second longitudinal elements being further provided with a pair of laterally spaced flanges depending from the lower surface thereof which extend into the lower longitudinal channels and bear against the side walls of the adjacent first longitudinal elements to prevent lateral displacement of the first and second longitudinal elements, said flanges being interrupted by the transverse slots in the lower surface of the second longitudinal elements.

2. The filter bottom of claim 1 wherein said transverse slots in the lower surface of said second longitudinal elements become shallower from the lateral faces of the longitudinal elements toward the longitudinal center thereof.

3. The filter bottom of claim 1 wherein the first longitudinal elements are provided with a plurality of spaced transverse channels therethrough providing communication between adjacent lower elongated channels.

4. The filter bottom of claim 3 wherein the transverse channels in the first longitudinal elements are formed by grooves in the lower surface of said first longitudinal elements.

5. The filter bottom of claim 1 wherein the upper surface of each first longitudinal element is provided with a pair of laterally spaced upwardly extending longitudinal ribs with upwardly converging side walls which together with the adjacent side walls of said second longitudinal elements form elongated slots which protect against clogging of said passages with filter media placed on top of said longitudinal elements.

6. The filter bottom of claim 1 wherein said first and second longitudinal elements each comprise a plurality of longitudinal blocks set end to end.

* * * * *